(12) United States Patent
Schiller

(10) Patent No.: US 6,720,688 B1
(45) Date of Patent: Apr. 13, 2004

(54) ELECTRIC MACHINE

(76) Inventor: Helmut Schiller, Scholzenviertel 7, 64625 Bensheim (DE)

( * ) Notice: Subject to any disclaimer, the term of this patent is extended or adjusted under 35 U.S.C. 154(b) by 0 days.

(21) Appl. No.: 09/913,423

(22) PCT Filed: Feb. 10, 2000

(86) PCT No.: PCT/EP00/01093
§ 371 (c)(1),
(2), (4) Date: Aug. 13, 2001

(87) PCT Pub. No.: WO00/48294
PCT Pub. Date: Aug. 17, 2000

(30) Foreign Application Priority Data

Feb. 12, 1999 (DE) .................. 299 02 510 U
Aug. 23, 1999 (DE) .................. 299 14 468 U

(51) Int. Cl.[7] ................................. H02K 1/32
(52) U.S. Cl. ................ 310/64; 310/57; 310/58; 310/59; 310/266; 310/268
(58) Field of Search ................. 310/261, 266, 310/268, 52–64; 320/156.32, 156.34, 156.36, 156.37

(56) References Cited

U.S. PATENT DOCUMENTS

| | | | | |
|---|---|---|---|---|
| 3,277,323 A | * | 10/1966 | Parker | 310/61 |
| 3,610,975 A | * | 10/1971 | Onjanow | 310/57 |
| 3,916,231 A | * | 10/1975 | Cathey | 310/62 |
| 3,999,092 A | * | 12/1976 | Whiteley | 310/156.32 |
| 4,187,441 A | * | 2/1980 | Oney | 310/112 |
| 5,057,726 A | * | 10/1991 | Mole et al. | 310/67 R |
| 5,179,307 A | * | 1/1993 | Porter | 310/68 B |
| 5,757,100 A | * | 5/1998 | Burgbacher | 310/186 |
| 5,789,833 A | * | 8/1998 | Kinoshita et al. | 310/64 |
| 5,892,307 A | * | 4/1999 | Pavlovich et al. | 310/68 B |
| 5,907,199 A | * | 5/1999 | Miller | 310/12 |
| 5,945,766 A | * | 8/1999 | Kim et al. | 310/268 |
| 5,977,684 A | * | 11/1999 | Lin | 310/268 |
| 5,982,058 A | * | 11/1999 | Bustamante et al. | 310/49 R |

FOREIGN PATENT DOCUMENTS

| | | |
|---|---|---|
| CH | 54389 | 12/1910 |
| DE | 1830480 | 5/1961 |
| DE | 4214483 | * 11/1993 |
| DE | 19701797 | * 7/1997 |
| GB | 2275371 | * 8/1994 |
| JP | 62296737 | * 12/1987 |
| WO | 9609680 | 3/1996 |
| WO | 9638902 | * 12/1996 |

* cited by examiner

*Primary Examiner*—Dang Le
(74) *Attorney, Agent, or Firm*—Norris McLaughlin & Marcus

(57) ABSTRACT

Electric machine (10) which can be operated as a motor or generator, with a rotor (26a, 26b) rotatably mounted in a housing (12), a rotor shaft (24) which extends beyond the housing (12) and a plurality of electromagnet components (28) which are statically disposed in the housing at uniform angular spacings and spaced from the axis of rotation of the rotor, each with a coil core (32) bearing a coil winding (30) consisting of one or more conductors. The pole faces of the end faces of the coil cores (32) are aligned with pole faces of permanent magnets (27) which are retained non-rotatably in or on the rotor and each have a polarity which is successively reversed in the peripheral direction. The coil cores (32) of the electromagnet components (28) are disposed parallel to the axis of rotation of the rotor shaft in the interior of the housing in such a way that their opposing end faces each lie in two planes which are spaced from one another and extend at right angles to the axis of rotation of the rotor shaft The ends of the electric conductors which form the coil winding (30) of the individual electromagnet components (28) are interconnected via an electric or electronic control device to form at least two pairs of electrical connections.

16 Claims, 6 Drawing Sheets

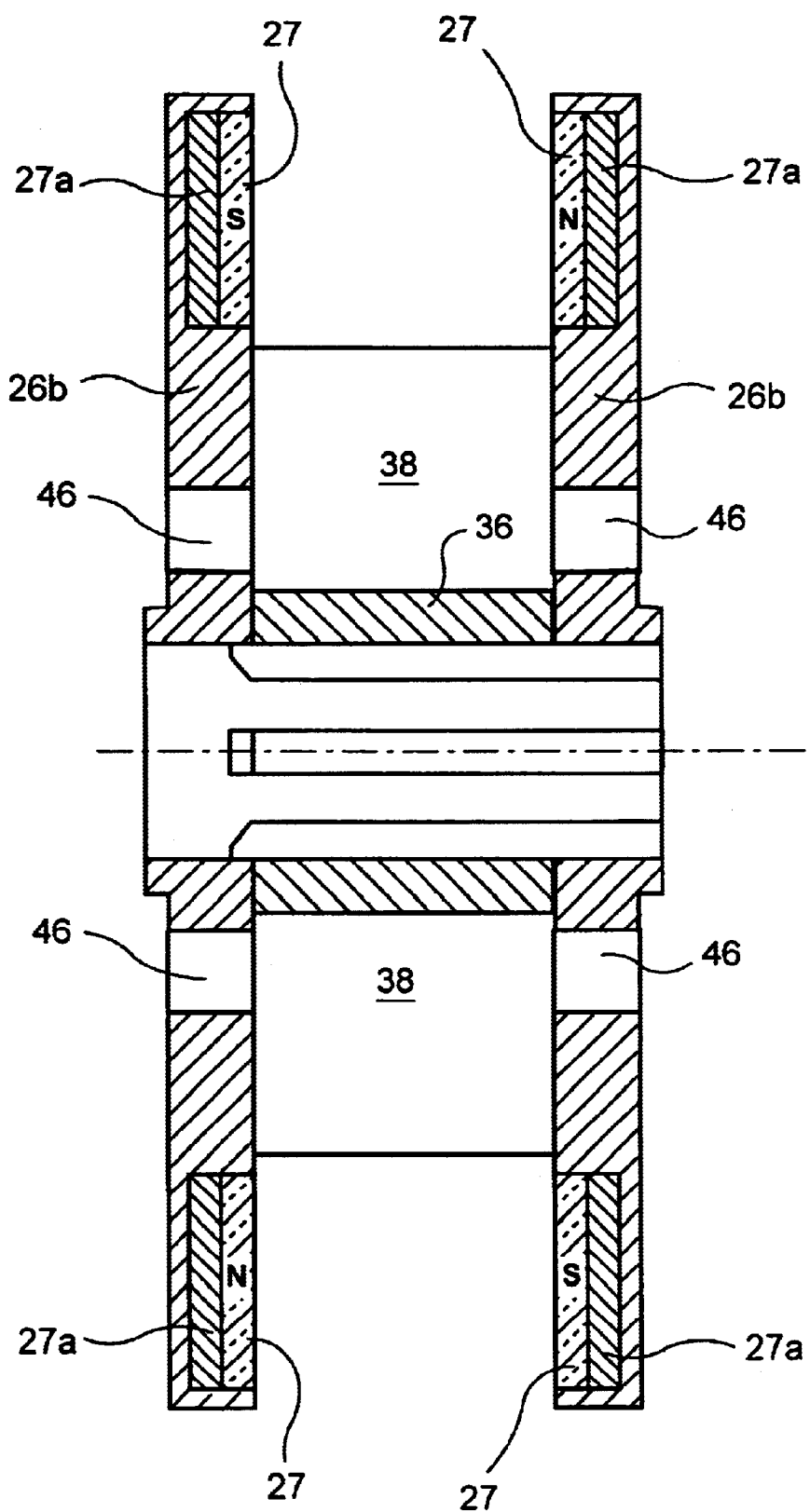
F I G. 5

ELECTRIC MACHINE

BACKGROUND OF THE INVENTION

An electric machine with a rotor which is rotatably mounted in a housing with a rotor shaft which extends beyond the housing, a plurality of electromagnet components which are statically disposed in the housing at uniform angular spacings and spaced from the axis of rotation of the rotor, each with a coil core bearing a coil winding consisting of one or more conductors and with permanent magnets which are disposed at uniform angular spacings and are non-rotatably retained in or on the rotor, these permanent magnets each having a pole face aligned opposite the end faces of the coil cores and each having a polarity which is successively reversed in the peripheral direction, wherein the coil cores of the electromagnet components are disposed parallel to the axis of rotation of the rotor shaft in the interior of the housing in such a way that their opposing end faces each lie in two planes which are spaced from one another and extend at right angles to the axis of rotation of the rotor shaft and the ends of the electric conductors which form the coil winding of the individual electromagnet components are interconnected via an electric or electronic control device to form at least two pairs of electrical connections and the rotor has at least two outer armature discs which extend radially to before the end faces of the coil cores and in which the permanent magnets are retained with their pole faces aligned with the respective associated end faces of the coil cores, the radially inner region of the said armature discs being provided with holes.

Such machines which can be connected to electric current sources are used for example as wheel hub motors for vehicle drives because of the favourable power-weight ratio. In this case these motors are designed so that the permanent magnets are retained in a disc, which is made from non-magnetic material and is non-rotatably connected to the rotor shaft, in such a way that their pole faces open freely on both sides into the flat sides of the disc-shaped rotor armature, the magnets being disposed so that in the peripheral direction successive pole faces on the same side of the armature have alternating polarities. The electromagnet components in the form of coils wound on metal cores are disposed on the inner faces of the housing cover or radial housing walls facing the disc-shaped rotor armature at a distance corresponding to the average radial distance of the permanent magnets from the axis of rotation of the rotor shaft. The control of these coils is achieved preferably by an electronic control device which generates a magnetic rotating field, so that the control of contacts sliding on a commutator, which is basically also conceivable but is susceptible to wear, is omitted. Such electronically controlled machines are also designated as brushless disc armature machines (GB 2 275 371 A). Furthermore, brushless disc armature machines are also known in which the rotor has two outer armature discs which extend radially to in front of the end faces of the coil cores which are fixed on the housing, the permanent magnets being retained in these armature discs with their pole faces aligned with the respective associated end faces of the coil cores (e.g. DE 197 01 797 A, FIG. 18; DE 42 14 483).

SUMMARY OF THE INVENTION

The object of the invention is to improve the efficiency of the known electric machines and to minimise any decline in the power due to reduction of the magnetisation of the permanent magnets over the course of time. At the same time the machines should be economical and simple to produce and should have a favourable unit weight.

Starting from an electric machine of the type mentioned in the introduction, this object is achieved according to the invention in that in each case pairs of legs, which succeed one another in the peripheral direction and are each provided with a pole face of different polarity on the free end facing the coil, of the permanent magnets provided in the two opposing outer armature discs are connected to one another in the end regions remote from the pole faces by a respective yoke which encloses the magnetic field and is made from soft or hard magnetic material, that the armature discs are connected to one another by radially extending walls which form the cavity between the armature discs into a plurality of chambers which are offset with respect to one another in the peripheral direction and are open towards the electromagnet components, and that the radially inner holes provided in the armature discs each open into the chambers of the rotor. The permanent magnets which are associated with the electromagnet components disposed centrally between both armature discs and thus are rigidly fixed on the peripheral wall of the housing of the machine are constructed in the manner of horseshoe magnets by means of the yokes which in each case connect two single magnets which succeed one another in the peripheral direction, resulting in a construction of the motor in which the magnetic field of the permanent magnets is kept contained as far as possible within the magnetic material of the permanent magnets, connected by the yoke, of the coil core, so that a low magnetic leakage field can be produced only in the narrow air gap between the end faces of the coil cores of the electromagnet components and the pole faces of the electromagnets. Losses of the magnetic rotating field generated in the electromagnetic components when the machine is switched on as motor are therefore minimised. This also applies when the machine is used as generator, which suggests itself for example for wind generators in which a direct coupling of the axis of rotation of the rotor to the output shaft of the wind wheel is possible without connection of a reduction gear between them. In addition to the favourable electric efficiency of the generator, the mechanical losses in the transmission gear are also avoided. In this case the radially extending walls which connect the armature discs act like the blades of a fan, i.e. via the radially inner holes in the armature discs air is drawn out of the housing and is blown radially outwards between the electromagnet components as a cooling air stream.

In the simplest case a row of electromagnet components is provided in the interior of the housing of the machine, and then the rotor has two outer armature discs guided on opposing sides in front of the coil core end faces of the electromagnet components.

The power of the machine can be increased without increasing the diameter in that two or more rows of electromagnet components spaced from one another in the longitudinal direction of the rotor shaft are disposed in the interior of the housing, wherein in addition to the two outer armature discs which are guided in front of the outer end faces of the coil cores, pointing in opposite directions, of the outermost rows the rotor has an additional armature disc with permanent magnets guided into each space between adjacent rows of electromagnet components in front of the end surfaces thereof which face one another, and the pole faces of differing polarity of the permanent magnets which are each exposed on opposing sides of the respective additional armature disc are aligned in the radial direction with the end faces of the coil cores of the rows of electromagnet components. Thus the permanent magnets disposed in the additional armature discs are—unlike the permanent magnets in the outer armature discs—constructed not as horseshoe magnets but as bar magnets of short length in order thus to keep the air gaps small between the pole faces of these magnets and the facing end surfaces of the coil cores of the electromagnet components and thus to avoid losses due to magnetic leakage fields.

In this case the interior of the housing is advantageously closed off and sealed against the external atmosphere, this sealing being achieved in the region of the shaft of the machine extending beyond the housing by a corresponding seal. The air drawn in from the housing through the radially inner holes in the armature discs and blown through between the electromagnet components takes up heat from the coils of the electromagnet components. Over the outer periphery of the armature discs the circulated air then passes into the space between the rotor and the end walls of the housing and is drawn back to the radially inner holes. In this way a self-contained air flow is produced in the interior of the housing and acts upon not only the electromagnet components but all other exposed surfaces in the interior of the housing and prevents the occurrence of locally higher temperatures (hot spots).

For removal of the heat produced in the machine and given off into the circulated air it is recommended that the outer and/or inner face of the housing be provided with ribs in order enlarge the surface of the housing which gives off or takes up heat. In this special case it may be advantageous if radially extending ribs are provided on the inner faces of the housing end walls facing the rotor and between these ribs radial channels are formed for the return of the gaseous atmosphere circulated in the interior of the housing.

Moreover the radial channels can be closed off on the armature disc side by a metal plate so that between the radial ribs channels are produced which are open only on the radially inner and radially outer end and are connected to the interior of the housing and through which the circulated air is returned.

The cooling of the electric machine according to the invention can also be carried out by through flows of ambient air, in that air inlet openings are provided in regions of the housing lying opposite the holes in the armature discs and air outlet openings which are offset radially outwards are provided in the housing.

In this case the electromagnet components are disposed at uniform spacings in the peripheral direction and protrude from the inner face of the peripheral housing wall into the space formed between the armature discs.

An embodiment in particular of the machine of the type mentioned in the introduction may be advantageous in which each pole face of the permanent magnets has in the peripheral direction an extent which covers two pole faces of the coils of two electromagnet components which succeed one another in the peripheral direction, and that the control means is designed so that in order to drive the rotor this control switches over the polarity of every second one of the electromagnet components which succeed one another in the peripheral direction with each rotation of the rotor about an angular spacing which corresponds to the angular spacing between two electromagnet components which succeed one another in the peripheral direction. This results in a 2-phase machine.

Alternatively three pole faces of the coils of three electromagnet components which succeed one another in the peripheral direction can be associated with each pole face of the permanent magnets, in which case the control means is designed so that in order to drive the rotor, after the rotor has rotated by an angular spacing corresponding to the angular spacing between electromagnet components which succeed one another in the peripheral direction, the control means switches over the polarity of every third one of the electromagnet components which succeed one another in the peripheral direction and thus a 3-phase machine is produced.

Basically more than three pole faces of the coils of electromagnet components which succeed one another in the peripheral direction can be associated with each pole face of the permanent magnets, in which the case the control means is designed so that in order to drive the rotor, after the rotor has rotated by an angular spacing corresponding to the angular spacing between electromagnet components which succeed one another in the peripheral direction, the control means successively switches over the polarity of every one of the electromagnet components, which succeed one another in the peripheral direction, of the group of electromagnet components associated with a permanent magnet.

By interconnection in each case of the coils of groups, which succeed one another in the peripheral direction, of electromagnet components which are associated in each case with a permanent magnet, the construction costs of the power electronics controlling the polarity of the coils relative to individual control of each individual coil are markedly reduced. Thus the electric control circuit in a 2-phase machine is also reduced to a 2-phase inverter control with variable amplitude and frequency. The four coils of four electromagnet components are located between two opposing horseshoe-shaped magnet segments. The first and the third coils are switched over simultaneously and in the next step the second and the fourth coils are switched over. The polarity of the first and third as well as of the second and fourth coil are opposed. The first and third as well as the second and fourth coil can therefore be firmly wired to one another, since the third and fourth coil are each controlled in mirror image to the first and second coil. Thus it is possible in practice to produce a 4-phase control with a 2-phase control.

The direction of rotation and the speed of the motor can be determined in that the switch-over point for the coils for switching over from one polarity to the other is controlled by way of a position pick-up which senses the relative rotational position of the rotor in the housing. Therefore the switch-over point for the control of the coil is determined by the sensor which predetermines the frequency. In this case the switch-over frequency is not identical to the motor speed, but it applies for one magnet segment. If the motor consists of ten segments with two switch pulses per phase and segment, then the switching frequency is 20 times the motor speed.

In this case a contactless sensor, particularly an optical sensor, which senses the relative rotational position of the motor with respect to the housing is provided as position pick-up.

The electromagnet components can each be advantageously held on separate support elements which can each be installed in an associated opening the in the peripheral wall of the housing in such a way that the pole faces of the coils of the electromagnet components are in the prescribed assembly position in alignment with the pole faces of the permanent magnets between the armature discs. In the event of damage to failure of the coil of individual electromagnet components, these electromagnet components can then be removed individually and repaired or replaced by new electromagnet components which are capable of functioning.

Alternatively the pre-installed arrangement of the electromagnet components in an annular mounting, which in turn is held in the interior of the housing, is also conceivable. However, this construction presupposes the possibility of separate installation of at least one of the armature discs of the rotor.

The electromagnet components can each also have two separate coils with opposed directions of winding, i.e. reversed-polarity differential windings, which can then be selectively controlled by an electric or electronic control device. In this way the polarity of the respective electromagnet components is reversible—depending upon the control of the respective coil winding.

If the machine according to the invention is to be used as a generator, the ends of the electrical conductors of each electromagnet component which form the coil winding are advantageously connected to the input connections of a separate rectifying circuit, and the rectifying circuits are then interconnected on the output side to a pair of electric bus lines. The direct current made up of the sum of the direct currents generated in the individual coils the respective associated rectifying circuit can then be tapped from the bus line. This embodiment is recommended particularly when the generator is driven at alternating speeds, such as may be the case for example with electric current generation using wind power in wind generators with rotor blades without blade adjustment due to differing wind speeds and wind strengths.

Then in an electronic inverter circuit which is connected downstream the direct current generated by such a generator can be converted into an alternating or three-phase current which is synchronised with the power supply.

The invention is explained in greater detail below in the following description of embodiments in conjunction with the drawings, in which:

BRIEF DESCRIPTION OF THE DRAWINGS

FIG. 5 shows a sectional view through the rotor, viewed in the direction of the arrows 5—5 in FIG. 4.

DETAILED DESCRIPTION OF THE PREFERRED EMBODIMENTS

Figure 4:
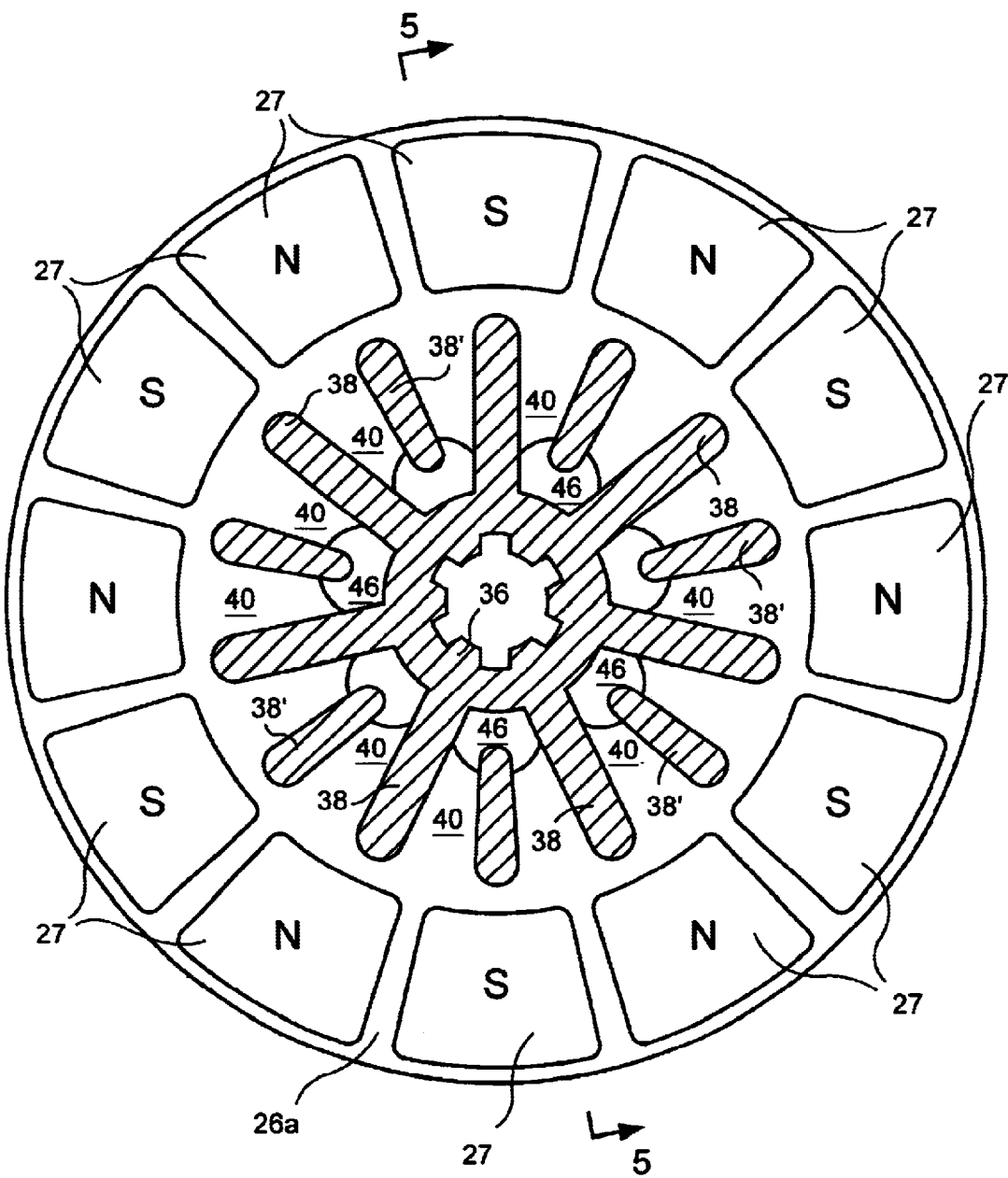
FIG. 4 shows a sectional view through the rotor of the electric machine shown in FIGS. 1 and 3, in the sectional plane corresponding to FIG. 3.

The embodiment of an electric machine according to the invention shown in FIG. 4, which is designated as a whole by 10 can basically be used as a motor or generator. In the special case the machine 10 has a housing 12 which is relatively short in the axial direction and is composed of two disc-like housing end walls 14a, 14b of relatively large diameter and the actual peripheral housing wall 16 which is practically shaped into a cylindrical ring of relatively short length. The housing end walls 14a, 14b and the peripheral housing wall 16 are connected to one another by screws or other fixing means—not shown—so as to be capable of being dismantled, and in order to simplify assembly and dismantling of the machine 10 the peripheral housing wall 16 can also be divided in a parting plane running through the longitudinal central axis of the housing into two peripheral wall halves which can be screwed to one another or can be connected to one another in some other way.

A bearing receptacle 20 for a radial bearing 22 is formed in each of the end walls 14a, 14b and a shaft 24 passing through the housing end wall 14a is rotatably mounted in these bearings.

In the radially outer regions of the armature discs 26a, 26b permanent magnets 27 are retained so that they succeed one another in the peripheral direction at uniform angular spacings, and the pole faces of these permanent magnets which face inwards, i.e. towards the respective opposing armature disc 26b, 26a, have a polarity which is successively reversed in the peripheral direction. Also the pole faces, which lie opposite one another in the axial direction, of the permanent magnets 27 of the two armature discs have different polarities. The permanent magnets 27 are retained in recesses in the armature discs 26a, 26b, whereby permanent magnets 27 which succeed one another in the peripheral direction are interlocked to form a horseshoe magnet in each case by connection of their end faces remote from the coil by means of a yoke made from hard or soft magnetic material largely enclosing a magnetic field.

Figure 1:
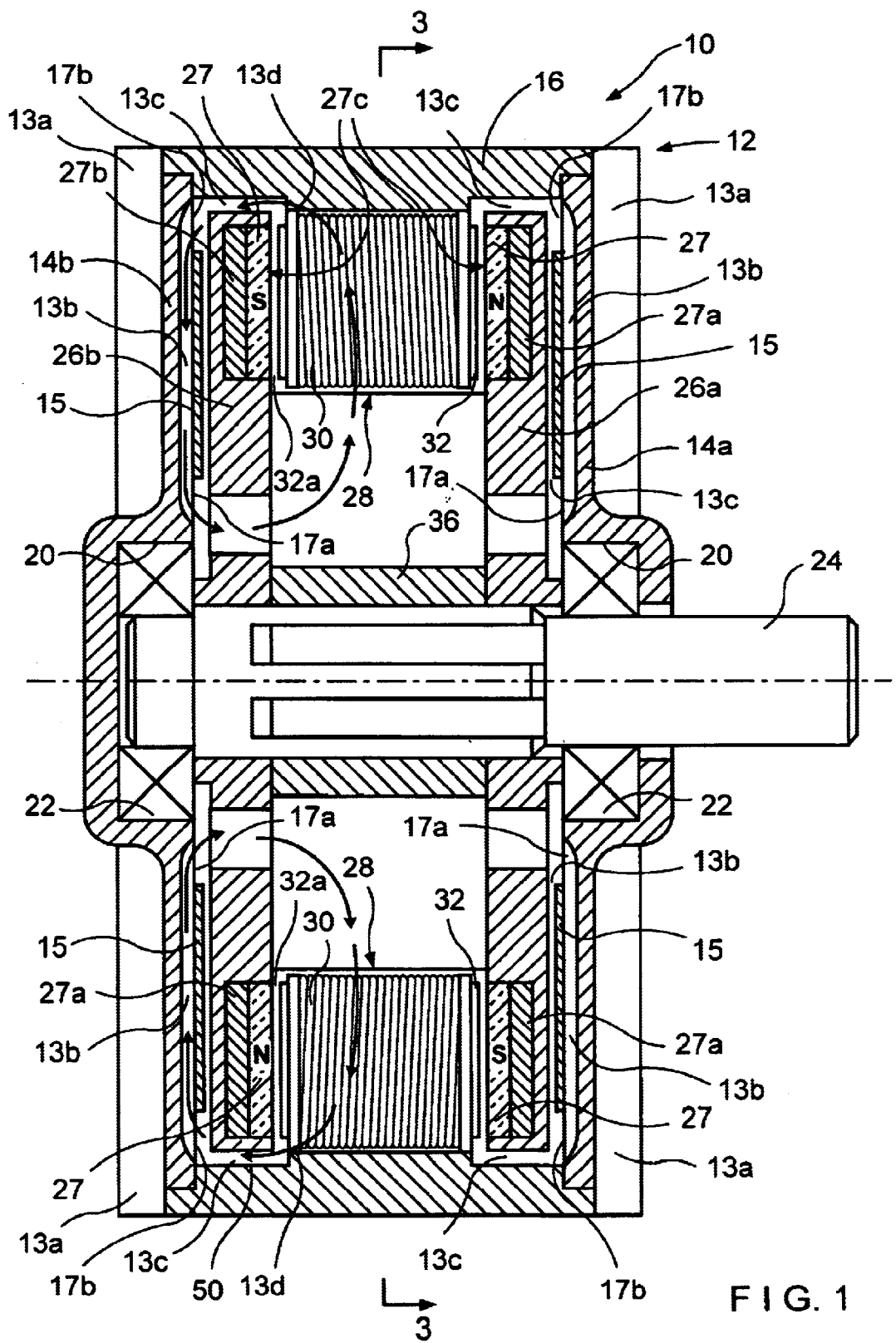
FIG. 1 shows a longitudinal central section through the axis of rotation of the rotor shaft of a first embodiment of an electric machine according to the invention with a row of electromagnet components and two outer armature discs.
Figure 6:
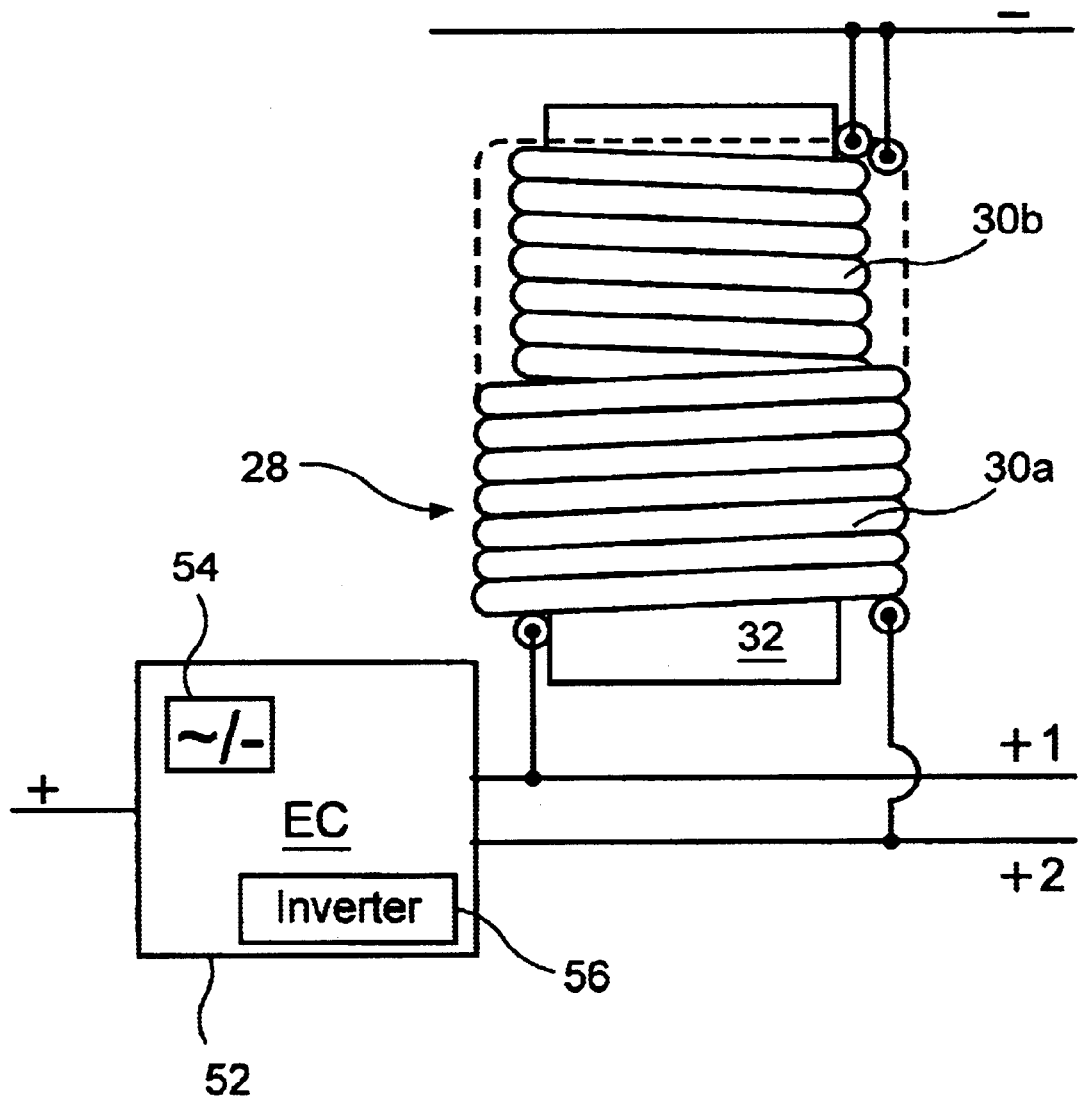
FIG. 6 shows a schematic circuit diagram of an electromagnet component which can be used in the electric machine according to the invention, in a special construction with two separate coil windings with opposed directions of winding which are placed on the coil core, these coil windings being selectively controllable by an electronic control device and thus capable of being switched over selectively in polarity.

Electromagnet components 28, each having a coil core 32 bearing a coil winding 30 consisting of one or more conductors, are disposed on the inner wall of the peripheral housing wall 16—likewise at uniform angular spacings. The ends of the conductors of the coil winding 30 are connected to an electronic control device by which the electric current delivered to the control device from an electric current source is fed into the coils 30 in a controlled manner in such a way that in the electromagnet components 28 a magnetic rotating field is generated which in interaction with the permanent magnets 27 disposed in the armature discs 26a, 26b results in a relative rotation of the rotor and thus of the shaft 24 with respect to the housing 12. Thus in conjunction with the aforementioned electronic control—not shown—the electric machine according to FIG. 1 constitutes a brushless electric axial field motor which can be driven by a direct current source. When conversely the shaft 24 is driven, an electric rotating field is generated by the permanent magnets 27 in the electromagnet components 28 rotating with the armature discs (26a, 26b), and this field can be tapped at the ends of the coils 30 of the electromagnet components 28 and used as direct current by a suitable rectifying circuit. The electric rotating field can alternatively be converted into rotating or alternating current by corresponding electronic control means 52, such as shown in FIG. 6. Referring to FIGS. 1 and 6, in a preferred embodiment, a position pick-up 50, as is well known in the art and which senses the relative rotational position of the rotor in the housing 12, is associated with the control means 52 for initiating the switching over of the polarity of the electromagnet components 28.

Figure 2:
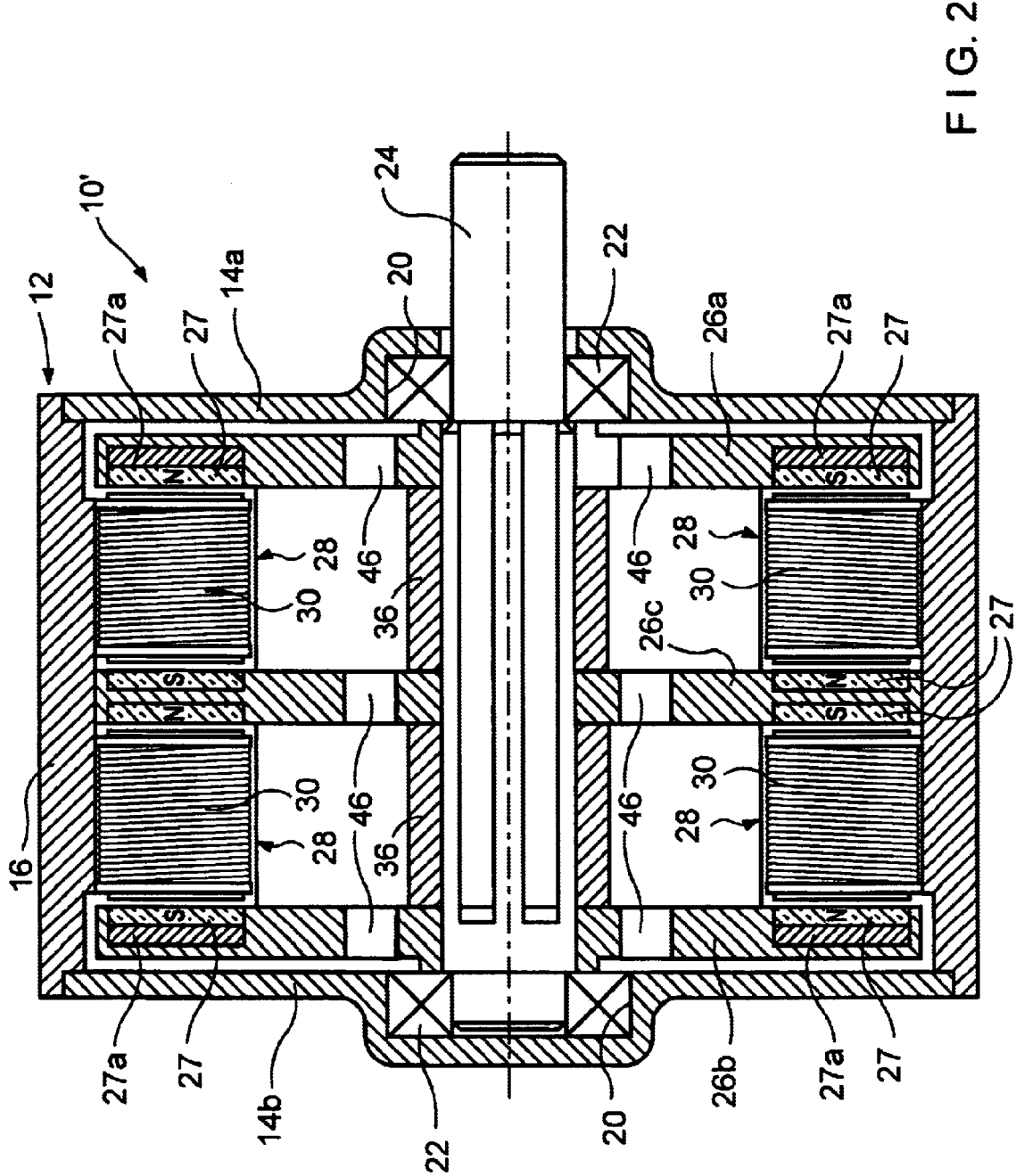
FIG. 2 shows a longitudinal central section, corresponding in the sectional orientation to FIG. 1, through a second embodiment with two rows of electromagnet components spaced from one another in the longitudinal direction and additionally with a central armature disc provided between the two rows of electromagnet components.

FIG. 2 shows an embodiment of the an electric machine according to the invention which is designated as a whole by 10' in which the power is increased without increasing the diameter in that two rows of electromagnet components 28 which are spaced from one another are disposed in the interior of the housing 12 in the longitudinal direction of the rotor shaft. In addition to the two outer armature discs 26a, 26b which are guided in front of the outer end faces of the coil cores, pointing in opposite directions, of the electromagnet components 28 the rotor has a third armature disc 26c additionally guided into the space between the two rows of electromagnet components 28. Permanent magnets 27 are set in this central armature disc 26. In this way the air gaps between the pole faces of the permanent magnets 27 and the end surfaces of the coil cores 32 of the electromagnet components 28 in the central armature disc 26c can be kept small and thus losses due to magnetic leakage fields are avoided. Here too the peripheral housing wall 16 is again divided along a central plane for assembly reasons.

Apart from the second row of electromagnet components 28 disposed offset in the axial direction and the arrangement of the additional central armature disc 26c, the machine corresponds functionally to the aforementioned electric machine described in connection with FIG. 1, so that with regard to the construction of the electric machine 10' it is otherwise sufficient to refer to the preceding description of the machine 10, since components of the two machines which are functionally the same are assigned the same reference numerals in the drawings.

It can be seen that a further increase in power without an increase in diameter is possible by arrangement of one or more further axially offset rows of electromagnet components between each of which an additional armature disc with permanent magnets is disposed.

Figure 3:
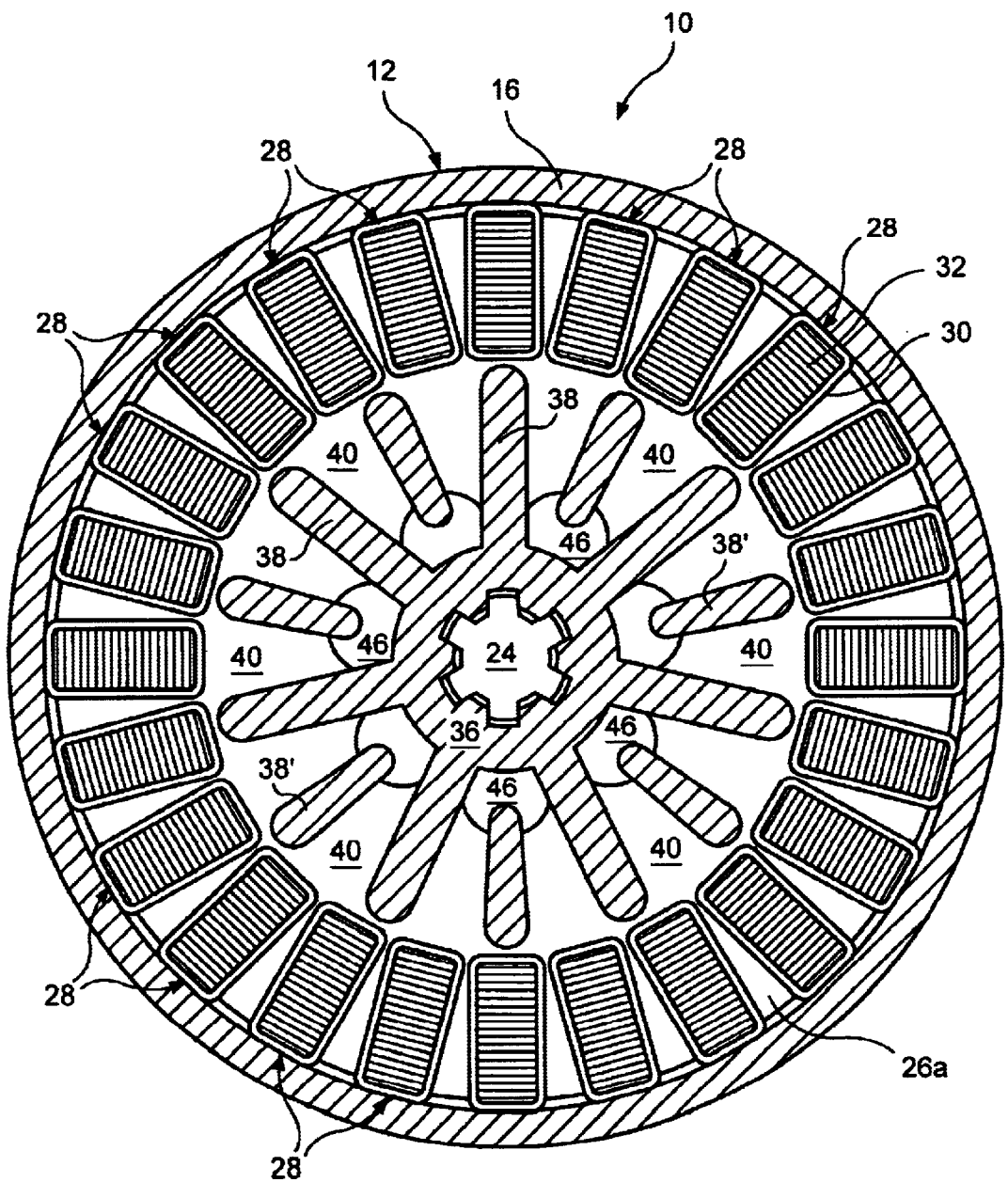
FIG. 3 shows a sectional view of the electric machine according to FIG. 1, viewed in the direction of the arrows 3—3 in FIG. 1.

From the sectional view shown diagrammatically in FIG. 3 of the electric machine shown in FIG. 1 it can be seen that from the peripheral wall 16 of the housing 12 electromagnet components 28—twenty-four in all in the illustrated case—are disposed in uniform distribution and offset with respect to one another in the peripheral direction.

The shaft 24 bears—as mentioned—the rotor which is retained non-rotatably on it and is also shown separately in FIGS. 4 and 5, this rotor having the two armature discs 26a, 26b made from non-magnetic material which are spaced from one another and extend radially into the vicinity of the peripheral housing wall 16 and in which are disposed the permanent magnets 27 which succeed one another in the peripheral direction and are held at uniform angular spacings, and in fact in the present case there are twelve permanent magnets in all, of which the pole faces 27c which face inwards, i.e. towards the respective opposing armature disc 26b, 26a have polarities which are successively reversed in the peripheral direction. Also the pole faces, which lie opposite in the axial direction, of the permanent magnets 27 of the two armature discs 26a, 26b have different polarities. In the illustrated embodiment each pole face of a permanent magnet extends in the peripheral direction over two pole faces 32a of the coil cores 32 of electromagnet components which succeed one another in the peripheral direction.

The ends (not shown) of the conductors of the coil winding 30 of the electromagnet components extend beyond the housing and are then connected in a suitable manner to the electronic control device already mentioned by which the electric current delivered from an electric current source is fed into the coils of the electromagnet components in a controlled manner in such a way that the electromagnet components 28 generate the magnetic rotating field which in interaction with the permanent magnets disposed on the armature discs 26a, 26b results in the rotation of the rotor and thus of the shaft 24.

The armature discs 26a, 26b are each disposed on the outer end surfaces of a hub body 36 (FIGS. 4 and 5) from which radial walls 38 protrude into the space between the armature discs 26a, 26b, the radial extent thereof being chosen such that the electromagnet components 28 protruding radially inwards from the peripheral housing wall 16 can still enter radially into the space between the armature discs 26a, 26b without butting against the radially outer ends of the radial walls 38 projecting from the hub body 36. Between each pair of radial walls 38 of the hub body 36 which succeed one another in the peripheral direction there are additionally provided radial walls 38' which are fixed on the inner faces of the armature discs 26a, 26b which face one another, so that a row of chambers 40 is formed which succeed one another in the peripheral direction, these chambers being closed off internally by the hub body 36 and laterally by the armature discs 26a, 26b respectively. Immediately above the hub body 36 inner holes 46 which lead into the chambers 40 are provided in both armature discs 26a and 26b. Thus with the rotor rotating air can pass via the holes 46 out of the interior of the housing and into the chamber 40 and is accelerated radially outwards there by the centrifugal force of the rotating rotor. This air flowing radially outwards then leaves the chambers 40 and encounters the electromagnet components projecting from the peripheral wall 16 of the housing 12 into the space between the armature discs 26a, 26b and passes through the spaces between these components, flows around them and can then pass beyond the peripheral surface of the armature discs again and into the space between armature discs 26a, 26b and the housing end walls 14a, 14b. Thus the rotor formed by the hub body, the radial walls 38 and 38' and the armature discs 26a, 26b simultaneously constitute the impeller of a fan which effects a forced circulating flow of the air enclosed in the housing or—in special cases—of a gas filling introduced there. As soon as the temperature in the forced circulating flow rises above the ambient temperature, heat is removed via the housing, i.e. the peripheral housing wall 16, the housing end walls 14a and 14b and ribs 13a on the outer surfaces of the housing walls 14a and 14b, to the external atmosphere. The provision of ribs on the surfaces of the housing promotes not only the transfer of heat from the forced circulating flow in the interior of the housing to the housing but also the emission of heat from the housing to the surrounding atmosphere. In a preferred embodiment, radially extending ribs 13b are provided on the inner faces of the housing end walls 14a, 14b facing the rotor and between these ribs radial channels 13c are formed for the return of the gaseous atmosphere 13d circulated in the interior of the housing. In still another preferred embodiment, the radial channels 13c are closed off on the armature disc side by a metal plate 15 so that, between the radial walls 38, 38', the channels 13c are produced which are open only on a radially inner end 17a and a radially outer end 17b and are connected to the interior of the housing and through which the circulated air is returned.

In a further preferred embodiment, instead of the forced circulating flow in the interior of the housing, cooling with external air can also take place if air inlets are provided in the housing end walls 14a and 14b approximately in alignment with the holes 46 in the armature discs 26a, 26b and outlet openings are provided in the peripheral housing wall 16 in the region between the electromagnet components 28.

FIG. 6 shows schematically the circuit of an electromagnetic component 28 of a special construction of the electromagnet components in which the coil core bears two coil windings 30a and 30b which are wound in opposing winding directions one above the other. It can be seen that the ends of the two coil windings 30a, 30b are connected to the same current conductor, whilst the other ends of the two coil windings are each connected to separate conductors leading to an electronic control unit EC 52 by means of which the second current conductor can be selectively switched to the first coil winding 30a or the second coil winding 30b.

With regard to the illustration of the coil winding in FIG. 6 it should also be pointed out that only half of the coil winding 30a is shown here in order to be able to show the upper part of the coil winding 30b lying below it. In practice the winding 30a extends over the entire length of the coil core 32. In such a case this is also referred to as a reversed-polarity differential winding.

Referring again to FIG. 6, in a preferred embodiment, the ends of the electrical conductors of each electromagnet component 28 which form the coil winding 30 are connected to the input connections of a separate rectifying circuit 54, which is integrated in the EC 52 as known in the art and is connected on the output side to a pair of electric bus lines. In a still further preferred embodiment, an electronic inverter circuit 56, which is integrated in the EC 52 also as known in the art, is connected downstream of the generator in order to convert the generated direct current into an alternating or three-phase current which is synchronized with the power supply.

It can be seen that within the scope of the inventive idea modifications and variants of the described embodiments of the electric machine 10 or 10' are possible.

When the electric machine 10 is driven as an electric motor, instead of the rotary power takeoff via the shaft 24 assumed in the description, as an alternative the shaft 24 can also be fixed via a suitable flange to a rigid component. When the motor is supplied with current the housing 12 is then set in rotation. In this embodiment the electric machine can be used as a wheel hub motor for driving vehicles directly on the wheels. In order that the electromagnet components 28, which in this case would rotate with the housing 12, do not have to be controlled via sliding contacts or brushes with electric current, the arrangement of the permanent magnets 27 and the electromagnet components 28 is advantageously exchanged, i.e. the electromagnet components are disposed in the rotor which is now held non-rotatably on the fixed shaft, whilst the permanent magnets 27 are disposed on the inner faces of the housing, i.e. the inner faces of the housing end walls 14a, 14b. In practice this is then a kinematic reversal of the electric machine 10. The current supply to the electromagnet components then takes place via supply lines which are laid firmly in the shaft.

What is claimed is:

1. An electric machine (10; 10') with a rotor (26a, 26b; 26c; 36) which is rotatably mounted in a housing (12) with a rotor shaft (24) which extends beyond the housing, a plurality of electromagnet components (28) which are statically disposed in the housing at uniform angular spacings and spaced from the axis of rotation of the rotor, each with a coil core (32) bearing a coil winding (30) consisting of one or more conductors and with permanent magnets (27) which are disposed at uniform angular spacings and are non-rotatably retained in or on the rotor, these permanent magnets each having a pole face aligned opposite end faces of the coil cores (32) and each having a polarity which is successively reversed in the peripheral direction, wherein the coil cores (32) of the electromagnet components (28) are disposed parallel to the axis of rotation of the rotor shaft (24) in the interior of the housing in such a way that their opposing end faces each lie in two planes which are spaced from one another and extend at right angles to the axis of rotation of the rotor shaft and the ends of the electric conductors which form the coil winding (30) of the individual electromagnet components (28) are interconnected via an electric or electronic control device to form at least two pairs of electrical connections and the rotor has at least two outer armature discs (26a, 26b; 26c) which extend radially to before the end faces of the coil cores and in which the permanent magnets are retained with their pole faces aligned with the respective associated end faces of the coil cores, the radially inner region of the said armature discs being provided with openings (46), wherein in each case pairs of legs, which succeed one another in the peripheral direction, have a free end and are each provided with a pole face of different polarity on the free end facing the coil, of the permanent magnets (27) provided in the two opposing outer armature discs (26a, 26b) are connected to one another in end regions remote from the pole faces by a respective yoke (27a) which encloses the magnetic field and is made from soft or hard magnetic material, wherein the armature discs (26a, 26b) are connected to one another by radially extending walls (38; 38') which form the cavity between the armature discs unto a plurality of chambers (40) which are offset with respect to one another in the peripheral direction and are open towards the electromagnet components (28), and wherein the radially inner openings (46) provided in the armature discs (26a, 26b) each open into the chambers (40) of the rotor;

wherein the housing includes end walls (14a, 14b) and a peripheral wall (16) defining an interior which is closed off and sealed against the external atmosphere; and wherein, when the rotor is rotating, a fluid contained within the interior of the housing is forced to flow from first spaces defined between the armature discs (26a, 26b, 26c) and the respective housing end walls (14a, 14b) through the openings (46) and into the chambers (40), and then radially outwardly over the outside and between the electromagnet components (28) and into second spaces defined between outer peripheral boundary faces of the armature discs (26a, 26b) and the peripheral wall (16), and then radially inwardly through the first spaces and back into the openings (46), thereby providing for forced circulatory flow of the fluid in a closed flow path defined by the housing and the rotor and extending through the coil windings.

2. The machine as claimed in claim 1, wherein a row of electromagnet components (28) is provided in the interior of the housing of the machine, and that the rotor has two outer armature discs (26a, 26b) guided on opposing sides in front of the coil core end faces of the electromagnet components (28).

3. The machine as claimed in claim 1, wherein two or more rows of electromagnet components (28) spaced from one another in the longitudinal direction of the rotor shaft are disposed in the interior of the housing, and that in addition to the two outer armature discs (26a, 26b) which are guided in front of the outer end faces of the coil cores (32), pointing in opposite directions, of the outermost rows the rotor has an additional armature disc (26c) with permanent magnets (27) guided into each space between adjacent rows of electromagnet components (28) in front of the end surfaces thereof which face one another, and the pole faces of differing polarity of the permanent magnets (27) which are each exposed on opposing sides of the respective additional armature disc are aligned in the radial direction with the end faces of the coil cores (32) of the rows of electromagnet components.

4. The machine as claimed in claim 1, wherein the outer and/or inner face of the housing (12) is provided with ribs in order enlarge the surface of the housing which gives off or takes up heat.

5. The machine as claimed in claim 4, wherein radially extending ribs are integrally provided on the inner faces of the housing end walls (14a; 14b) facing the rotor and between these ribs radial channels are formed for the return of the fluid circulated in the interior of the housing.

6. The machine as claimed in claim 5, wherein the radial channels are closed off on the armature disc side by a plate so that, between the radial walls (38; 38'), the channels open only on a radially inner end and a radially outer end and are connected to the interior of the housing and through which the circulated air is returned.

7. The machine as claimed in claim 1, wherein the electromagnet components (28) are disposed at uniform spacings in the peripheral direction and protrude from the inner face of the peripheral housing wall (16) into the space formed between the armature discs (26a, 26b).

8. The electric machine as claimed in claim 1, wherein each pole face of the permanent magnets (27) has in the peripheral direction an extent which covers at least two pole faces of the coils (30, 32) of two electromagnet components (28) which succeed one another in the peripheral direction, and that the control means is designed so that in order to drive the rotor this control means switches over the polarity of every second one of the electromagnet components which succeed one another in the peripheral direction with each rotation of the rotor about an angular spacing which corresponds to the angular spacing between two electromagnet components (28) which succeed one another in the peripheral direction.

9. The machine as claimed in claim 8, wherein a position pick-up which senses the relative rotational position of the rotor in the housing (12) is associated with the control device for initiating the switching over of the polarity of the electromagnet components (28).

10. The machine as claimed in claim 9, wherein the position pick-up is constructed as a contactless sensor, particularly an optical sensor, which senses the relative rotational position of the rotor with respect to the housing.

11. The electric machine as claimed in claim 1, wherein more than three pole faces of the coils of electromagnet components which succeed one another in the peripheral direction can be associated with each pole face of the permanent magnets, in which the case the control means is designed so that in order to drive the rotor, after the rotor has rotated by an angular spacing corresponding to the angular spacing between electromagnet components which succeed one another in the peripheral direction, the control means successively switches over the polarity of every one of the electromagnet components, which succeed one another in the peripheral direction, of the group of electromagnet components associated with a permanent magnet.

12. The machine as claimed in claim 1, wherein the electromagnet components (28) are each held on separate support elements which can each be installed in an associated opening the in the peripheral wall (16) of the housing (12) in such a way that the pole faces of the coils of the electromagnet components (28) are in the prescribed assembly position in alignment with the pole faces of the permanent magnets (27) between the armature discs.

13. The machine as claimed in claim 1, wherein electromagnet components (28) as a whole are pre-installed in an annular mounting, which in turn is held in the interior of the housing.

14. The machine as claimed in claim 1, wherein the electromagnet components (28) each have two separate coils with opposed directions of winding (reversed-polarity differential windings 30a, 30b respectively), and that an electric or electronic control device (EC) is provided for the selective electric control of each of the coil windings (30a; 30b).

15. The machine as claimed in claim 1, which operates as a generator, wherein the ends of the electrical conductors of each electromagnet component (28) which form the coil winding (30) are connected to the input connections of a separate rectifying circuit, and that the rectifying circuits are connected on the output side to a pair of electric bus lines.

16. The machine as claimed in claim 15, wherein an electronic inverter circuit is connected downstream of the generator in order to convert the generated direct current into an alternating or three-phase current which is synchronized with the power supply.

* * * * *